(12) United States Patent
Wolfe et al.

(10) Patent No.: US 6,168,377 B1
(45) Date of Patent: Jan. 2, 2001

(54) METHOD AND APPARATUS FOR ELIMINATING THERMAL BOWING OF STEAM TURBINE ROTORS

(75) Inventors: Christopher Edward Wolfe, Niskayuna; Frederick George Baily, Ballston Spa; Lawrence Edward Rentz; Alexander Morson, both of Clifton Park; Norman Arnold Turnquist, Cobleskill; Paul Thomas Marks, Clifton Park, all of NY (US); Roger Jordan Carr, Westminster, MA (US)

(73) Assignee: General Electric Co., Schenectady, NY (US)

( * ) Notice: Under 35 U.S.C. 154(b), the term of this patent shall be extended for 0 days.

(21) Appl. No.: 09/238,257

(22) Filed: Jan. 27, 1999

(51) Int. Cl.$^7$ .................................................. F01D 11/00
(52) U.S. Cl. .................... 415/174.2; 415/231; 415/174.5
(58) Field of Search ............................ 415/173.3, 173.5, 415/173.4, 174.2, 174.4, 174.5, 176, 178, 230, 231

(56) References Cited

U.S. PATENT DOCUMENTS

| | | | |
|---|---|---|---|
| 4,415,309 | * 11/1983 | Atterbury | 415/170 R |
| 4,756,536 | 7/1988 | Belcher . | |
| 5,026,252 | * 6/1991 | Hoffelner | 415/174.2 |
| 5,351,971 | 10/1994 | Short . | |
| 5,474,305 | 12/1995 | Flower . | |
| 5,474,306 | 12/1995 | Bagepalli et al. . | |
| 5,749,584 | 5/1998 | Skinner et al. . | |

FOREIGN PATENT DOCUMENTS

| | | |
|---|---|---|
| 23 44 666 | 3/1974 | (DE) . |
| 23 66 059 | 9/1977 | (DE) . |
| 0 453 315 | 10/1991 | (EP) . |
| 0 534 686 | 3/1993 | (EP) . |
| 379209 | 10/1907 | (FR) . |
| 2 191 825 | 12/1987 | (GB) . |
| 2 301 635 | 12/1996 | (GB) . |
| 56-060804 | 5/1981 | (JP) . |

* cited by examiner

Primary Examiner—Edward K. Look
Assistant Examiner—Ninh Nguyen
(74) Attorney, Agent, or Firm—Nixon & Vanderhye

(57) ABSTRACT

Brush seals are employed on steam turbine rotors without the risk of causing thermal rotor bowing and without compromising the sealing performance. In one form, a groove in the rotor has an insert in frictional contact with the brush seal. The non-uniform distribution of heat due to frictional contact between the brush seal and proud portions of the rotor is dissipated within the insert such that adjoining rotor portions are substantially uniformly heated without causing thermal bow. In a further form, a groove or grooves are provided in the rotor surface adjacent the brush seal and maintain non-uniform heat distribution locally in the rotor without causing thermal bow of the rotor. In another form, a land projects radially outwardly of the rotor surface in contact with the brush seal. The non-uniform distribution of heat due to frictional contact between proud portions of the land and the brush seal dissipates into a uniform distribution of heat in the rotor proper to avoid thermal bowing. In a final form, the brush seal has frictional contact with bucket dovetail or wheel protrusions spaced radially outwardly of the rotor such that non-uniform distribution dissipates into a uniform distribution within the rotor.

13 Claims, 6 Drawing Sheets

METHOD AND APPARATUS FOR ELIMINATING THERMAL BOWING OF STEAM TURBINE ROTORS

TECHNICAL FIELD

The present invention relates to apparatus and methods for eliminating thermal bowing of the rotor of a steam turbine resulting from non-uniform distribution of heat about the rotor due to frictional contact between a brush seal and a proud portion of the rotor.

BACKGROUND OF THE INVENTION

Steam turbines for the generation of power typically include a continuous solid elongated shaft carrying the turbine wheels and buckets. Steam turbines of impulse design typically operate above the rotor's first bending critical frequency and often near the second bending critical frequency. Steam turbine rotors, however, often have proud or high spots on the rotor, resulting from operations or run-outs caused by machining operations. Brush seals can be used for sealing between the rotors and stationary components in steam turbines. Brush seals typically comprise a plurality of metal bristles projecting from the stationary component toward the rotating component, i.e., the rotor, with the tips of the bristles engaging with and bearing against the rotor surface. Sustained rubbing between the rotor and the brush seals can lead to thermal bowing of the rotor or exacerbate an existing bowed condition of the rotor. That is, the friction generated by contact between the rotor and the stationary brush seals leads to an uneven, i.e., non-uniform, temperature distribution about the circumference of the rotor. The proud portion of the rotor therefore becomes increasingly hotter than circumferentially adjacent portions of the rotor, resulting in non-uniform axial expansion of the rotor and hence a bow in the rotor. This non-uniform temperature distribution can be particularly pronounced during start-up when there is no cooling flow about the rotor.

Thermal bowing of the rotor in steam turbines becomes an issue because bowing will cause an imbalance which can adversely affect the rotor dynamic behavior of the rotor system.

Brush seals have previously been installed in steam turbines with an initial clearance sized to ensure that the bristles do not contact the rotor during start-up. This approach eliminates or minimizes rotor dynamics concerns with brush seals. However, sealing performance is significantly compromised.

BRIEF SUMMARY OF THE INVENTION

In accordance with the present invention, the rotor is modified to accommodate brush seals without compromising their sealing performance, yet enabling operation of the turbine. The present invention generally prevents the non-uniform circumferential distribution of heat generated by frictional contact between the rotor and the brush seal, which would otherwise cause a differential temperature about the rotor at the location of the seal tending to bow the rotor, and provides a substantially uniform distribution of heat about the rotor at the axial location of the brush seal which permits axial expansion of the rotor without bowing.

In a preferred embodiment of the present invention, the preferential heating of the proud portion of a rotor due to frictional contact with the brush seal is eliminated and, to the extent heat generated by such frictional contact is applied to the rotor, it is substantially uniformly distributed about the rotor. To accomplish the foregoing, the rotor is provided with a groove and an insert in the form of a circumferential ring is disposed in the groove. The outer surface of the ring lies in contact with the bristles of the brush seal. The contact between the insert ring and the rotor inhibits circumferential non-uniform heat transfer to the rotor. That is, when the insert is heated locally by frictional contact with the brush seal bristles, the heat will spread circumferentially about the insert faster than it will spread axially or radially into the rotor shaft. As a result, the interface between the insert and rotor tends toward a circumferentially uniform temperature distribution and, consequently, the heat generated by the frictional contact between the brush seal and the insert is substantially evenly distributed by the insert into the rotor. The increased heat applied to the rotor at the axial location of the brush seal may expand the rotor axially but will not bow the rotor because of the uniform distribution of the heat into the rotor. The insert may be thermally insulated from the rotor by providing thermal coatings on the rotor insert interface. Alternatively, the insert may be connected to the rotor by ribs which reduce the effective heat transfer to the rotor, i.e., insulates the rotor from the insert, by creating small dead air spaces therebetween.

In another aspect of the present invention, a circumferentially extending groove is formed in the rotor at a location axially spaced from but adjacent to the frictional contact between the rotor and the brush seal. As indicated previously, the proud portion of the rotor will generate an uneven temperature distribution circumferentially about the rotor at the axial location of the contact between the brush seal and the rotor's surface. However, this uneven heat distribution will travel axially along the rotor only to a limited extent which does not cause a bow. That is, the non-uniformly generated heat about the rotor is localized, i.e., stopped by the groove, and consequently, a thermal bow does not appear in the rotor. Preferably, a pair of rotor grooves are disposed on opposite sides of the contact between the brush bristles and the rotor.

A further aspect of the present invention resides in the provision of a protrusion about the rotor at the axial location of the rotor's contact with the brush seal. Thus, a radially outwardly directed land on the rotor may be provided, the land preferably having axially extending flanges. The land and the flanges enable substantially uniform distribution of heat circumferentially about the land and flanges before the heat penetrates the rotor. At the time of heat penetration into the rotor, the land and flanges are substantially uniformly heated whereby the rotor likewise is substantially uniformly heated, thereby avoiding the formation of a bow in the rotor due to uneven heating about the rotor at the axial location of the brush seal.

In a further aspect of the present invention, the location of the frictional contact between the stationary and rotary components can be moved radially outwardly away from the rotor so as not to become part of a continuous surface of the rotor, which would otherwise bow the rotor resulting from uneven heat distribution. For example, the contact surface between the rotor and the stationary component can be provided by a protrusion on a bucket dovetail located radially outwardly of the surface of the rotor. The heat generated by the frictional contact between the brush seal and the bucket dovetail protrusion will essentially become uniformly distributed about the wheel prior to passing within the rotor. Similarly, the protrusion may be provided on the wheel rather than on the dovetail.

In a preferred embodiment according to the present invention, there is provided in a steam turbine having a rotor and a non-rotating component about the rotor carrying a brush seal for sealing engagement with the rotor, a method of substantially eliminating bowing of the rotor resulting from circumferentially non-uniform distribution of heat about the rotor due to frictional contact between the brush seal and a proud portion of the rotor, comprising the step of inhibiting circumferential non-uniform heat transfer to the rotor generated by frictional contact between the proud portion of the rotor and the brush seal.

In a further preferred embodiment according to the present invention, there is provided a steam turbine comprising a rotor and a non-rotating component about the rotor, a brush seal carried by the non-rotating component for sealing engagement with the rotor including a proud portion of the rotor and means for inhibiting circumferential non-uniform heat transfer to the rotor generated by frictional contact between the proud portion of the rotor and the brush seal whereby bowing of the rotor resulting from non-uniform distribution of heat about the rotor due to frictional contact between the brush seal and a proud portion of the rotor is eliminated.

Accordingly, it is a primary object of the present invention to enable the use of brush seals on steam turbine rotors that operate near critical bending frequencies without risk of causing rotor thermal bow and without compromising the sealing performance of the brush seal.

DETAILED DESCRIPTION OF THE INVENTION

Figure 1:
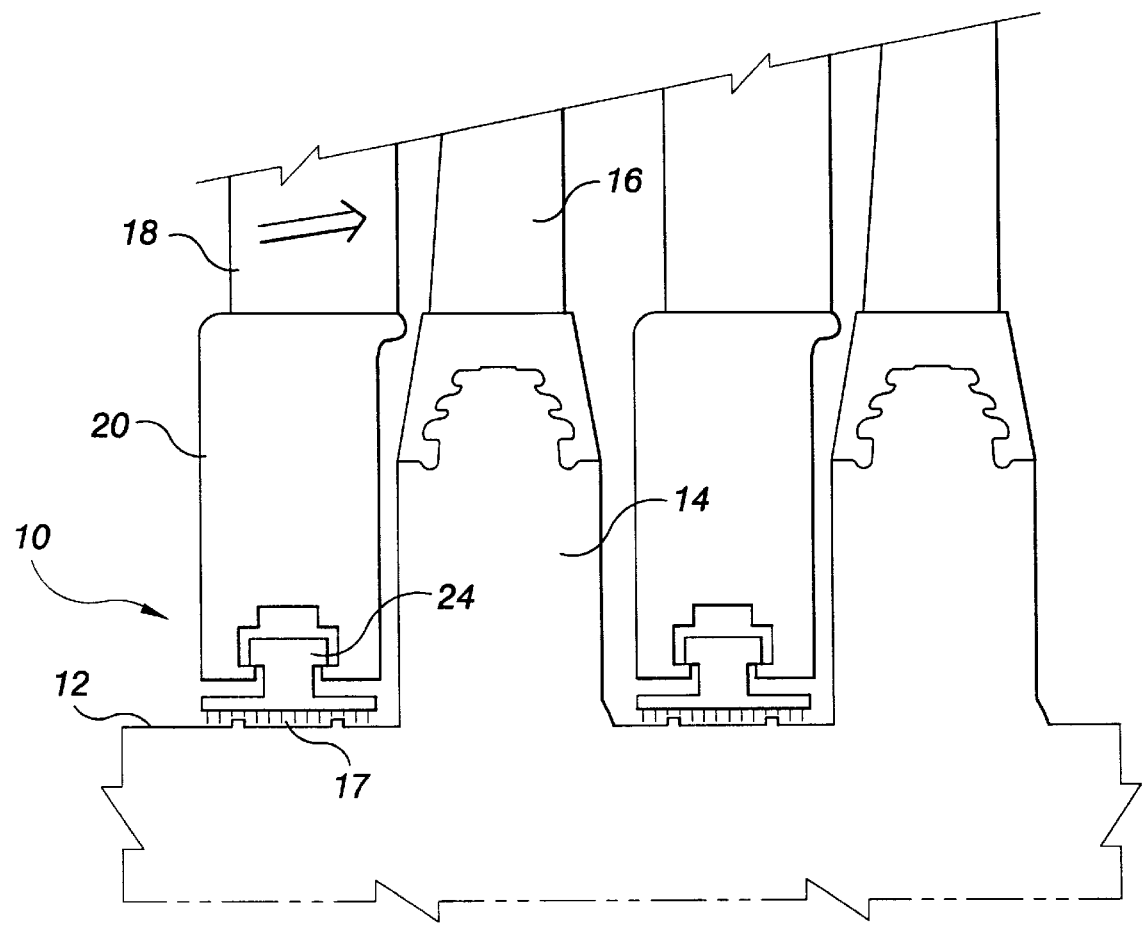
FIG. 1 is a fragmentary schematic cross-sectional view of the rotor of a steam turbine illustrating the rotor wheel buckets and nozzles.

Referring now to FIG. 1, there is illustrated a steam turbine, generally designated 10, preferably of the impulse design, having a rotor or shaft 12 (hereafter referred to as a rotor) mounting a plurality of axially spaced wheels 14 for mounting buckets 16. A series of nozzle partitions 18 are interspersed between the buckets and form with the buckets 16 a steam flow path indicated by the arrow. The partitions 18 are attached to a diaphragm inner web 20 extending between the wheels 14 of the stages of the turbine. It will be appreciated that the rotor 12 is a continuous solid elongated piece of metal, in contrast to the formation of a rotor in a gas turbine, which comprises a plurality of built-up wheels and disks bolted one to the other. Labyrinth seals 17 are typically provided on packing ring segments 24 for sealing the rotary and stationary components one to the other.

Figure 2:
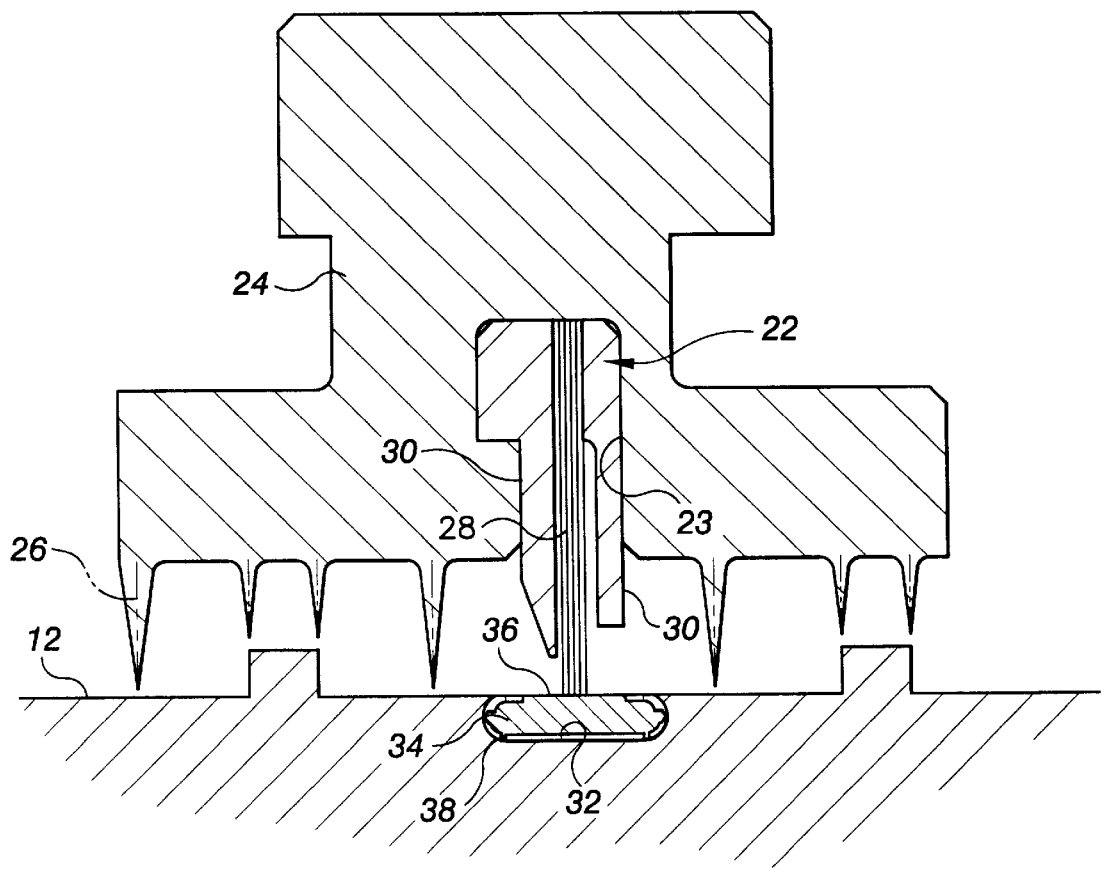
FIG. 2 is a cross-sectional view of a packing ring with a brush seal engaging a rotor in accordance with the present invention.

Brush seals are also employed at various locations along the rotor and for effective sealing performance, lie in contact with the rotor throughout all phases of operation of the steam turbine. Brush seals have also been employed in combination with labyrinth seals. Thus, as illustrated in FIG. 2, a brush seal, generally designated 22, is carried by a traditional labyrinth seal packing ring segment 24 having a plurality of labyrinth teeth 26 projecting radially inward toward but out of contact with the rotor 12. The brush seal 22 comprises a plurality of, preferably metal, bristles 28 disposed between a pair of plates 30 extending circumferentially about the rotor 12. Brush seal 22 is disposed and retained in a groove 23 in the packing ring segment 24 and it will be appreciated that the packing ring segments 24 comprise a plurality of arcuate segments, as does the brush seal carried thereby, arranged circumferentially about the rotor 12.

To prevent non-uniform distribution of heat about the rotor due to frictional contact between the tips of the bristles 28 of brush seal 22 and a proud portion of the rotor 12, a groove 32 is provided about the rotor 12 at the axial location of the contact between the brush seal and rotor. An insert ring 34, for example, formed of a pair of 180° segments, is disposed in the groove 32. The outer circumferentially extending surface 36 of the insert ring 34 lies flush with the outer surface of the rotor 12 but may be recessed within or project from the rotor as desired. The insert ring is, of course, located at the axial location of the contact between the rotor and the brush seal.

In a preferred form, the insert ring 34 has a plurality of circumferentially extending ribs 38 for bearing against the surface of the groove 32 and which ribs mount the insert ring within the groove. Major surfaces of the insert are therefore spaced from the rotor surfaces defining groove 32. Thus, thermal insulating spaces are provided between the ring 34 and rotor 12. Alternatively, thermally insulating material can be coated on the insert ring or groove, or both, or disposed between the insert ring and the surface of the groove to thermally insulate the ring from the rotor.

It will be appreciated that the frictional contact between the brush seal 22 and the insert ring 34 generates heat and that any proud portion of the rotor including the insert ring 34 will generate a non-uniform temperature distribution at the area of contact. However, by installing an insert ring, the heat generated by frictional contact with the brush seal will extend circumferentially about the insert at a rate faster than the rate of heat penetration from the insert ring into the rotor such that a substantially uniform circumferential distribution of heat about the insert is achieved prior to any substantially non-uniform distribution of heat occurring in the adjacent portions of the rotor. Consequently, when the rotor is heated, resulting from the frictional contact between the insert and the bristles of the brush seal, the heating will be substantially uniform. Thus, non-uniform distribution of heat in the rotor which may cause bowing of the rotor is avoided.

Figure 3:
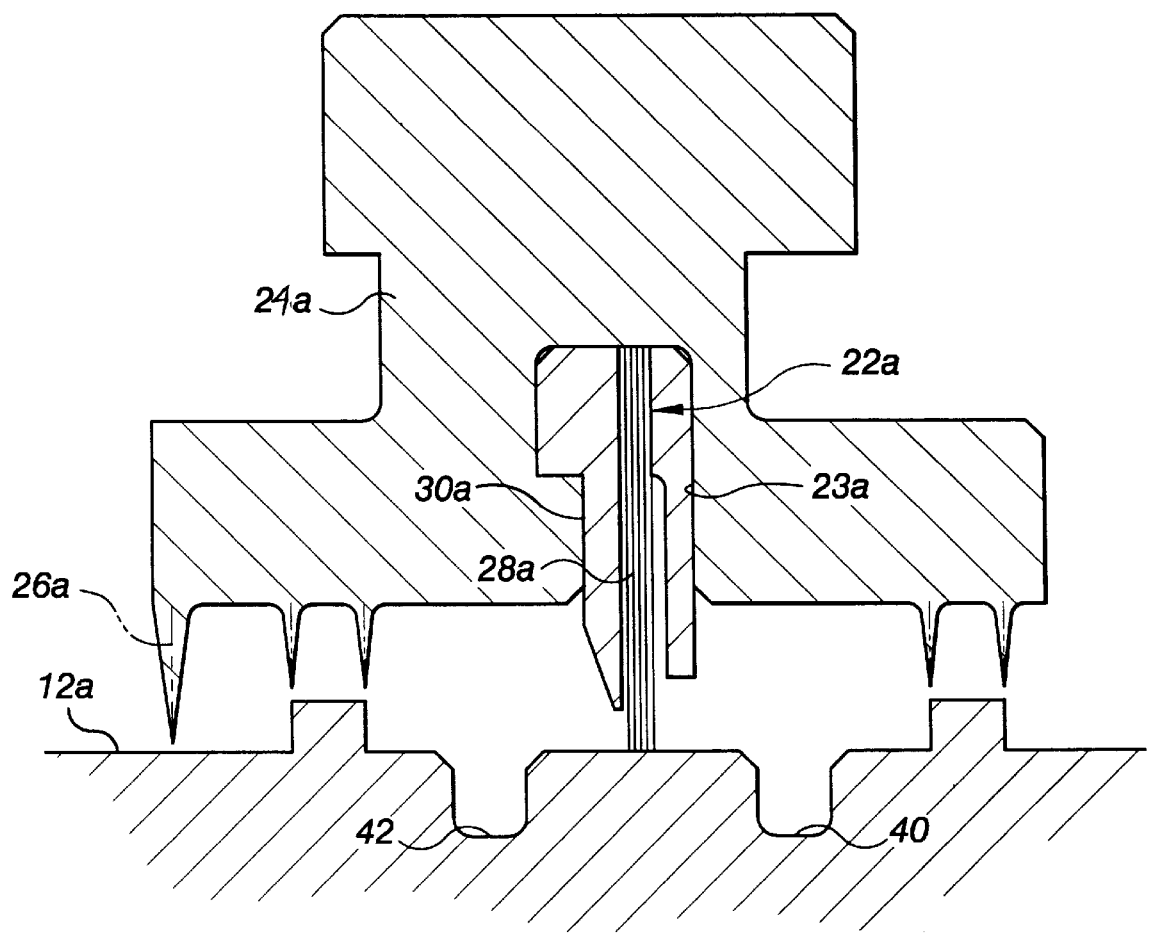
FIGS. 3 and 4 are views similar to FIG. 2 illustrating further embodiments of the present invention.

Referring now to FIG. 3, wherein like reference numerals are applied to like parts, followed by the suffix "a," the contact between the brush seal and the rotor 12a occurs on a circumferential surface of the rotor upstream or downstream from a groove 40 formed in the rotor surface. That is, groove 40 is formed at a location axially adjacent the brush seal. A further groove 42 is formed circumferentially about the rotor on the opposite side of the brush seal 22a from groove 40. Preferably, both grooves 40 and 42 are used, although use of one groove on either the upstream or downstream side of the brush seal may be sufficient.

It will be appreciated that in this form of the invention, the heat generated by contact between the brush seal 22a and the surface of the rotor adjacent groove 40 or between the grooves 40 and 42 may preferentially heat proud portion(s) of the rotor, i.e., a circumferentially non-uniform thermal distribution. However, non-uniform distribution of heat about the contact surface with the brush seal occurs only locally adjacent to groove 40 or between the grooves 40 and 42. Thus, non-uniform distribution of heat about the surface of the rotor is localized adjacent to groove 40 or between the grooves 40 and 42 such that bowing does not occur. As the heat penetrates into the rotor due to frictional contact between the brush seal and proud portions of the rotor, the distribution of heat radially inwardly of the groove 40 or between grooves 40 and 42 becomes substantially circumferentially uniform, causing axial expansion of the rotor but not differential expansion on opposite sides of the rotor which may cause bowing. That is, the annular rotor portion between the rotor surface and the base(s) of the groove(s) is heated substantially circumferentially non-uniformly, whereas the continuous portion or ligament of the rotor radially inwardly of the base(s) of the groove(s) is heated circumferentially substantially uniformly.

Figure 4:
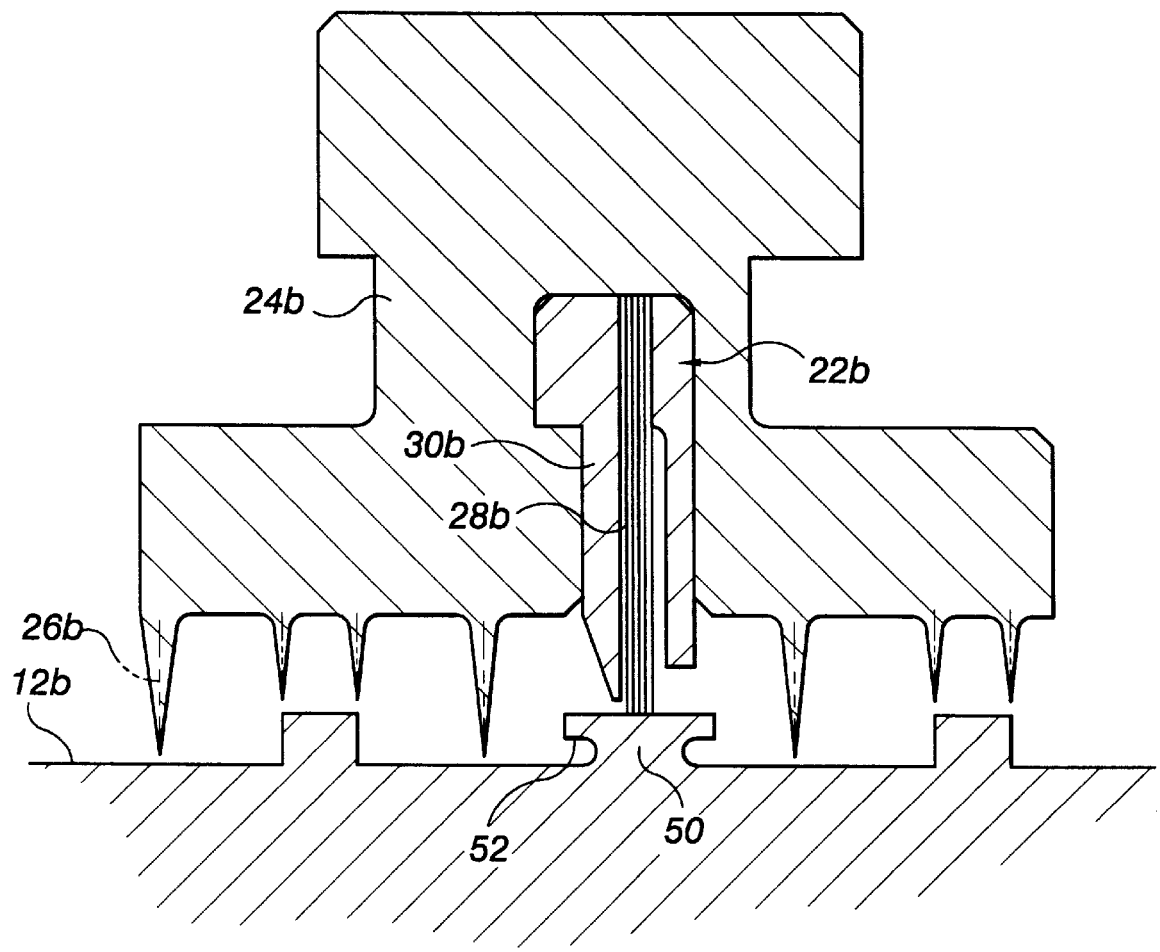

Referring now to the form of the present invention illustrated in FIG. 4, wherein like parts are designated by like reference numerals as in the previous embodiments, followed by the suffix "b," there is illustrated a radially projecting land 50 formed at an axial location along shaft 12b corresponding to the axial location of the brush seal 22b, the tips of the bristles 28b of the brush seal 22b lying in contact with the land 50. The land 50 has a pair of axially extending flanges or ribs 52 spaced outwardly of the rotor surface, although it will be appreciated that one such rib or flange 52 may suffice. The land is sized and shaped to limit the magnitude of heat penetrating radially inwardly into the rotor 12b at the circumferential location of the contact of the land with the brush seal. That is, as heat is generated in a non-uniform manner about the land 50 by contact with the brush seal, heating proud portions of the rotor, i.e., heating portions of the land preferentially, the heat passes in a circumferential direction at a rate faster than the heat penetrates radially inwardly such that the heat generated by this frictional contact is substantially uniformly distributed when it penetrates radially inwardly of the surface of the rotor which defines the rotor proper. For example, the rotor may be considered as a beam with the land 50 a projection carried by the beam. Thus, the heat generated in the projection will essentially be uniformly distributed when it reaches the load-bearing portions of the beam (rotor), albeit the heat is distributed non-uniformly about the circumference of the land due to the non-uniform frictional contact of proud portion(s) of the land with the brush seal. The flanges 52 facilitate the delivery of the heat circumferentially about the land at a rate faster than the heat penetrates radially inwardly.

Figure 5:
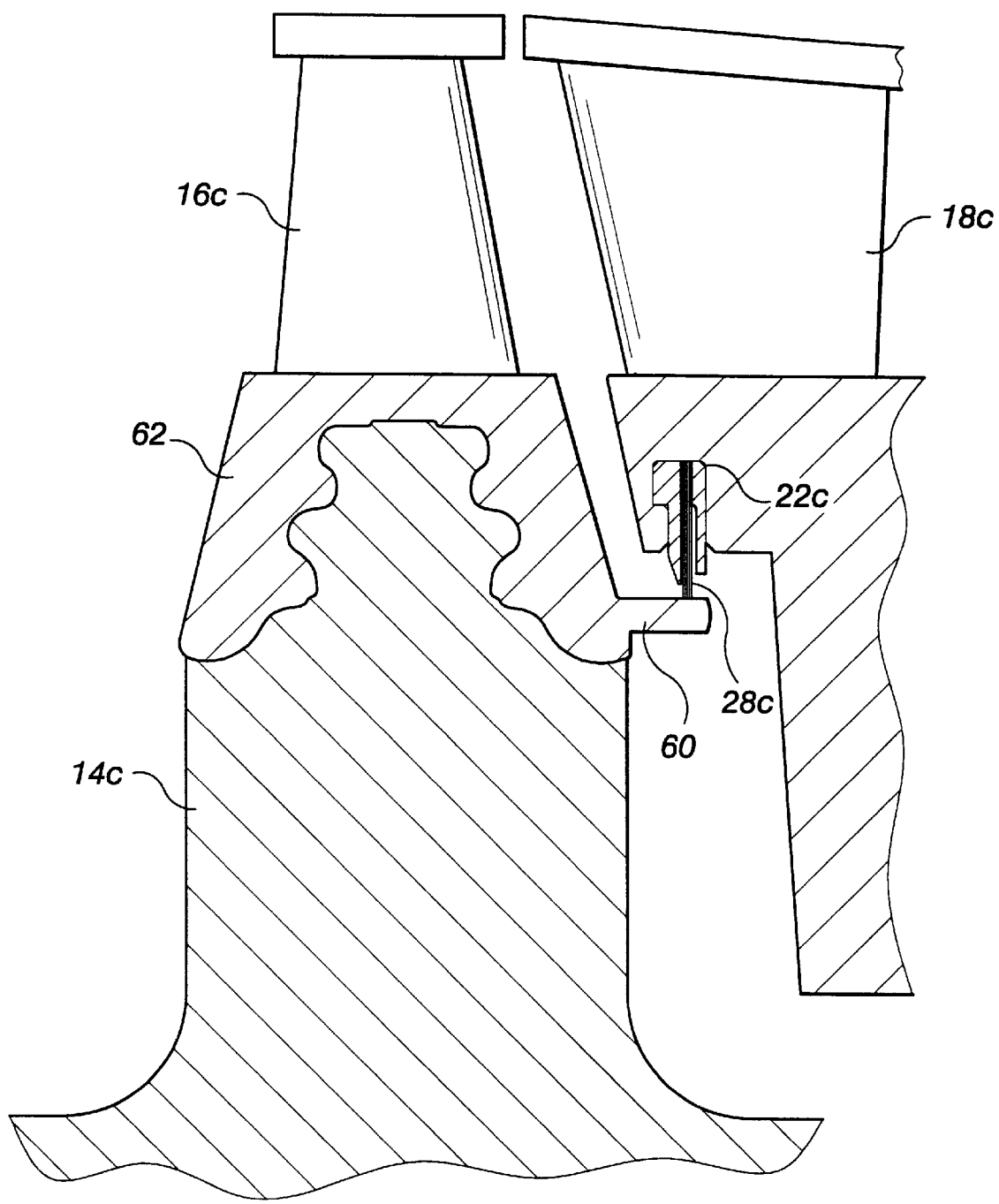
FIG. 5 is a fragmentary cross-sectional view of a wheel with a bucket dovetail protrusion in combination with a brush seal in accordance with the present invention.
Figure 6:
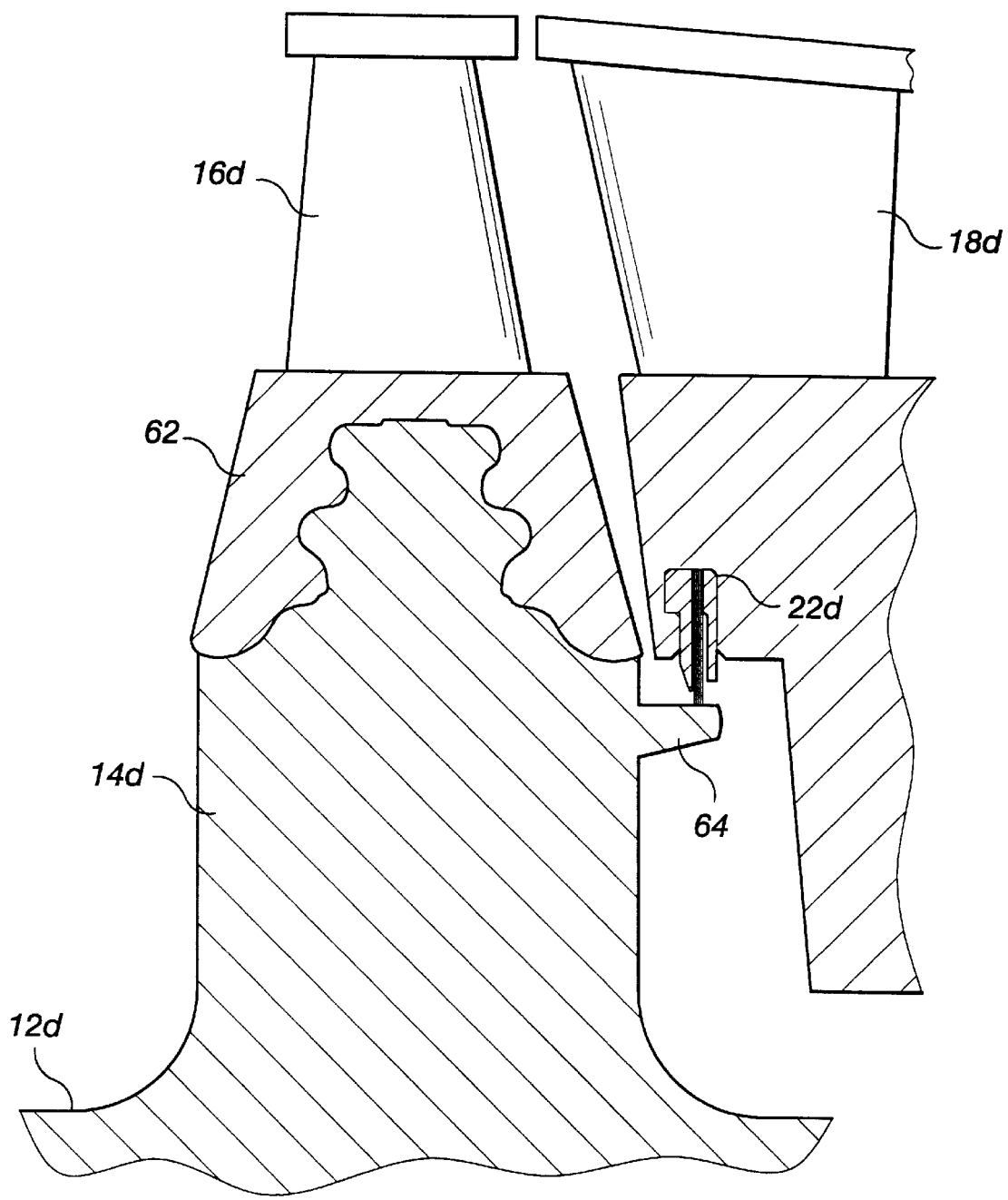
FIG. 6 is a view similar to FIG. 5 illustrating the protrusion on the wheel in combination with a brush seal.

Referring now to the form of the invention illustrated in FIG. 5, wherein like reference numbers refer to like parts followed by the suffix "c," the brush seal is located radially outwardly of the rotor and lies in contact with an axially extending protrusion 60 carried by the bucket dovetail 62. Consequently, while the protrusion 60 may be differentially heated in the event the rotor is bowed, the mounting of the contact surface between the brush seal and protrusion radially outwardly of the shaft precludes non-uniform distribution of heat in the rotor resulting from the frictional contact between the brush seal and the protrusion. To the extent the heat penetrates radially inwardly from the protrusion into the rotor, the distribution of heat will be essentially uniform within the rotor, causing axial expansion but not causing thermal bowing. Referring to FIG. 6, wherein like reference numerals are applied to like parts as in previous embodiments, followed by the suffix "d," the brush seal 22d lies in frictional contact with an axially extending protrusion 64 carried by the wheel 14d of the rotor 12d. Similarly as in the previous embodiment, the non-uniform distribution of heat generated by frictional contact between the brush seal and proud portions of the protrusion when penetrating radially inwardly toward the rotor 12d, essentially becomes a uniform distribution of heat in the rotor. Consequently, by locating the brush seal radially outwardly of the rotor surface, non-uniform distribution of heat in the rotor causing thermal bowing is eliminated.

As a consequence of these various constructions, the steam turbine rotors that operate near critical bending frequencies, operate without the risk of causing rotor thermal bow and without compromising the sealing performance of the seal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a steam turbine having a rotor and a non-rotating component about the rotor carrying a brush seal for sealing engagement with the rotor, a method of substantially eliminating bowing of the rotor resulting from circumferentially non-uniform distribution of heat about the rotor due to frictional contact between the brush seal and a proud portion of the rotor, comprising inhibiting circumferential non-uniform heat transfer to the rotor generated by frictional contact between the proud portion of the rotor and the brush seal, including providing a groove in the rotor at an axial location corresponding to an axial location of the brush seal and providing an insert in said groove for engaging the brush seal.

2. A method according to claim 1 including substantially uniformly heating said insert in a circumferential direction before substantially heating the rotor surrounding the groove to ensure substantial uniform circumferential distribution of heat from the insert to the rotor.

3. A method according to claim 1 including limiting the contact between said insert and a surface defining said groove to limit heat transfer from the insert to the rotor.

4. A method according to claim 3 including contacting said insert and said grooved surface at locations interrupted by non-contact portions between said insert and said grooved surface.

5. A method according to claim 1 including thermally insulating said insert and said grooved surface from one another.

6. In a steam turbine having a rotor and a non-rotating component about the rotor carrying a brush seal for sealing engagement with the rotor, a method of substantially eliminating bowing of the rotor resulting from circumferentially non-uniform distribution of heat about the rotor due to frictional contact between the brush seal and a proud portion of the rotor, comprising inhibiting circumferential non-uniform heat transfer to the rotor generated by frictional contact between the proud portion of the rotor and the brush seal, including providing a groove in the rotor at a location spaced axially from an axial location of the contact between the brush seal and the rotor, thereby distributing heat generated by the frictional contact between the rotor and the brush seal substantially uniformly about the rotor at locations radially inwardly of a base of said groove to prevent thermal bowing of the rotor.

7. In a steam turbine having a rotor and a non-rotating component about the rotor carrying a brush seal for sealing engagement with the rotor, a method of substantially eliminating bowing of the rotor resulting from circumferentially non-uniform distribution of heat about the rotor due to frictional contact between the brush seal and a proud portion of the rotor, comprising inhibiting circumferential non-uniform heat transfer to the rotor generated by frictional contact between the proud portion of the rotor and the brush seal, including providing grooves in the rotor at locations on opposite axial sides of the brush seal and spaced axially from the axial location of the contact between the brush seal and the rotor, thereby distributing heat generated by the frictional contact between the rotor and the brush seal substantially uniformly about the rotor at locations radially inwardly of bases of said grooves to prevent thermal bowing of the rotor.

8. A steam turbine comprising:

a rotor and a non-rotating component about the rotor;

a brush seal carried by said non-rotating component for sealing engagement with the rotor including a proud portion of the rotor; and means for inhibiting circumferential non-uniform heat transfer to the rotor generated by frictional contact between the proud portion of the rotor and said brush seal whereby bowing of the rotor resulting from non-uniform distribution of heat about the rotor due to frictional contact between the brush seal and a proud portion of the rotor is eliminated wherein said inhibiting means includes a groove in the rotor at an axial location corresponding to an axial location of the brush seal and an insert in said groove for engaging the brush seal.

9. Apparatus according to claim 8 wherein said inhibiting means includes support elements between said insert and a surface defining said groove spacing said insert from said groove surface thereby thermally insulating said insert and said groove surface from one another.

10. A steam turbine comprising:

a rotor and a non-rotating component about the rotor;

a brush seal carried by said non-rotating component for sealing engagement with the rotor including a proud portion of the rotor; and means for inhibiting circumferential non-uniform heat transfer to the rotor generated by frictional contact between the proud portion of the rotor and said brush seal whereby bowing of the rotor resulting from non-uniform distribution of heat about the rotor due to frictional contact between the brush seal and a proud portion of the rotor is eliminated, wherein said inhibiting means includes a groove in the rotor at a location spaced axially from an axial location of the engagement between the brush seal and the rotor, whereby heat generated by frictional contact between the rotor and the brush seal is distributed substantially uniformly about the rotor at locations radially inwardly of a base of said groove to prevent thermal bowing of the rotor.

11. Apparatus according to claim 10 including a second groove in the rotor at a location on an opposite side of the brush seal from the first-mentioned groove and spaced axially from the axial location of the engagement between the brush seal and the rotor.

12. A steam turbine comprising:

a rotor and a non-rotating component about the rotor:

a brush seal carried by said non-rotating component for sealing engagement with the rotor including a proud portion of the rotor;

means for inhibiting circumferential non-uniform heat transfer to the rotor generated by frictional contact between the proud portion of the rotor and said brush seal whereby bowing of the rotor resulting from non-uniform distribution of heat about the rotor due to frictional contact between the brush seal and a proud portion of the rotor is eliminated, said inhibiting means including a rib circumferentially about and projecting radially outwardly of said rotor for engagement with the brush seal and at least one axially extending flange on said projecting rib for distributing heat generated by said frictional contact substantially uniformly about said rotor.

13. A steam turbine comprising:

a rotor and a non-rotating component about the rotor;

a brush seal carried by said non-rotating component for sealing engagement with the rotor including a proud portion of the rotor; and means for inhibiting circumferential non-uniform heat transfer to the rotor generated by frictional contact between the proud portion of the rotor and said brush seal whereby bowing of the rotor resulting from non-uniform distribution of heat about the rotor due to frictional contact between the brush seal and a proud portion of the rotor is eliminated;

said rotor including a plurality of buckets having bucket dovetails for connection with complementary dovetails on a wheel of said rotor said inhibiting means including an axial extending protrusion on each said turbine bucket dovetail in frictional engagement with said brush seal, said axial protrusion being outwardly of the dovetail connections between the bucket dovetails and the rotor wheel.

* * * * *